2,929,847
Patented Mar. 22, 1960

2,929,847
ACYCLIC HYDRAZINIUM CHLORIDES

Bernard Rudner, Luther O. Young, and Marguerite E. Brooks, Baltimore, Md., assignors to W. R. Grace & Co., New York, N.Y., a corporation of Connecticut No Drawing. Application February 20, 1957
Serial No. 641,271

7 Claims. (Cl. 260—583)

This invention relates to quaternary nitrogenous salts. In one specific aspect, it relates to quaternized derivatives of substituted hydrazines. In still another aspect, it relates to novel acyclic hydrazinium chlorides.

Heretofore, quaternary hydrazinium salts have been obtained only on a laboratory scale. A known preparation of these interesting compounds comprises the reaction of 1,1-di-substituted hydrazines with alkylating agents, e.g., methylchloride. Because of the extreme difficulties involved in preparing the parent hydrazines and the limitations of their final alkylation (see O. Westphal, Berichte der Deutschen Chemischen Gesellschaft, 74: 759 et. seq., 1,365 et. seq. (1941), only limited types of hydrazinium chlorides have been heretofore available. Using Westphal's method it is obvious that the preparation of any specific hydrazinium cation depends on the availability of the substituted hydrazine, as well as the ability of that substituted hydrazine to undergo alkylation with the necessary alkyl halide. Among the compounds discovered by Westphal were the trihexyl hydrazinium chloride, the dodecyldimethyl hydrazinium chloride, the hexadecyldimethyldrazinium bromide and hexadecyldimethylhydrazinium iodide. Because of the inherent limitation of his alkylation reaction, Westphal found it impossible to prepare hydrazinium chlorides of greater chain length than the dodecyldimethylhydrazinium salt. He was more successful using methyl bromide and methyl iodide as alkylating agents; however, he did not prepare hydrazinium salts having a carbon chain longer than 16 carbon atoms. Since long chain alkyl substituted hydrazines are not readily available, the only known compounds of this particular type are those prepared by Westphal. We have discovered certain homologous and analogous acyclic hydrazinium salts which Westphal was unable to prepare directly by his method. Our novel acylic hydrazinium chlorides possess properties and utility which are completely unobvious in view of the known prior art. This application is a continuation in part of our co-pending applications S.N. 546,784, filed November 14, 1955, and S.N. 560,282, filed January 20, 1956, both now abandoned.

It is therefore an object of the present invention to provide a new generic class of acyclic hydrazinium chlorides which, because of their unique properties and utility, are commercially acceptable for purposes beyond the realm of utility possessed by any similar prior art compounds.

In accordance with the present invention we have made available a new class of useful hydrazinium chlorides having the general formula:

In the above formula R is an aliphatic hydrocarbon residue having from 16-24 carbon atoms. More specifically it is an alkyl, alkenyl, or alkadienyl radical having from 16-24 carbon atoms. R' and R" are members selected from the group consisting of alkyl radicals having from 1 to 24 carbon atoms, alkenyl radicals having from 2 to 24 carbon atoms, and alkadienyl radicals having from 4 to 24 carbon atoms.

It has recently been discovered that chloramine will react with tertiary amines to form tri-substituted hydrazinium chlorides. This new reaction presents practically limitless possibilities for the preparation of novel and interesting chemical compounds which, because of their structure and inherent physical properties, have a wide range of uses. Tertiary amines are readily available bases. Chloramine is an excellent reagent since it can be economically obtained in commercial quantities by using the well known process of Harry H. Sisler et al., described in U.S. Pat. 2,710,248 where chlorine and ammonia are reacted in the vapor phase to produce chloramine (monochloramine). By treating a class of tertiary amines containing long chain aliphatic residues with chloramine we have discovered the new generic class of hydrazinium salts referred to hereabove.

In preparing the compounds of the present invention it is usually suitable to contact chloramine with a solution of the selected tertiary amine, allow the reaction to proceed until the desired quantity of chloramine is consumed and then isolate and purify the resultant hydrazinium chloride by standard laboratory techniques. While chloramine is most advantageously prepared in the form of a gaseous chloramine-ammonia-nitrogen stream obtained from a generator constructed according to the teachings of Sisler et al., other methods are equally adaptable for the purposes of the present invention. For instance, chloramine can be made by reacting chlorine with an excess of ammonia in a halogenated hydrocarbon solvent under controlled conditions of mixing at low temperatures. Such a procedure is fully described in U.S. Patent No. 2,678,258 to John F. Haller. Another effective procedure is that of Coleman et al., fully described in Inorganic Syntheses, vol. I, 59 (1939). Alternatively, the compounds of the present invention can be made directly by the procedure described in the co-pending application of Bernard Rudner, S.N. 605,230, filed August 20, 1956, which teaches the reaction of chlorine, ammonia and tertiary amine in the presence of excess ammonia. For simplicity, when both the amine and the product are soluble in the same inert solvent, we have found the Rudner method to be a preferred technique.

Tertiary amines suitable for the purposes of the present invention are shown hereunder in Table 1. These suggested amines are intended to be merely illustrative, since it is obvious that the homologues of these compounds embraced by the general formula set forth above would be equally applicable in the production of individual species of our new and novel class.

TABLE 1

| Parent Amine | Product |
|---|---|
| Hexadecyldimethyl | 1,1-dimethyl-1-hexadecyl hydrazinium chloride. |
| Hexadecylmethylethyl | 1-ethyl-1-hexadecyl-1-methyl hydrazinium chloride. |
| Hexadecylmethylallyl | 1-allyl-1-hexadecyl-1-methyl hydrazinium chloride. |
| Hexadecyldi-1-amyl | 1,1-di-1-amyl-1-hexadecyl hydrazinium chloride. |
| Trihexadecyl | 1,1,1-trihexadecyl hydrazinium chloride. |
| Methyl-bis-(2-methylhexadecyl) | 1-methyl-1,1-bis-(2-methylhexadecyl) hydrazinium chloride. |
| Dimethyl-8-octadecyl | 1,1-dimethyl-1-(8-octadecyl) hydrazinium chloride. |
| Diethyloctadecenyl-7 | 1,1-diethyl-1-(7-octadecenyl) hydrazinium chloride. |
| Decylethyloctadecyl | 1-decyl-1-ethyl-1-octadecyl hydrazinium chloride. |
| Ethylbis-(7,10-octadecadienyl) | 1-ethyl-1-bis-(7,10-octadecadienyl) hydrazinium chloride. |
| Trioctadecyl | 1,1,1-trioctadecyl hydrazinium chloride. |
| Dimethylnonadecyl | 1,1-dimethyl-1-nonadecyl hydrazinium chloride. |
| Methylundecylnonadecyl | 1-methyl-1-nonadecyl-1-undecyl hydrazinium chloride. |
| Dimethyl(2,4,4,6,6,8,8 heptamethylnonyl-2 | 1,1-dimethyl-1-(2,4,4,6,6,8,8 heptamethylnonyl-2) hydrazinium chloride. |
| Diethyleicosyl | 1,1-diethyl-1-eicosyl hydrazinium chloride. |
| (4,6,8,10,12,14-hexamethylpentadecyl-2-)dimethyl. | 1,1-dimethyl-1-(4,6,8,10,12,14-hexmethylpentadecyl-2) hydrazinium chloride. |
| Diethylbrassidyl | 1,1-diethyl-1-brassidyl hydrazinium chloride. |
| Diethylerucyl | 1,1-diethyl-1-erucyl hydrazinium chloride. |
| Dimethyl(2,4,4,6,6,8,8,10,10,12,12 undecamethyltridecyl-2-). | 1,1-dimethyl-1-(2,4,4,6,6,8,8,10,10,12,12 undecamethyltridecyl-2-) hydrazinium chloride. |
| Di-n-propyltetracosanyl | 1,1-di-n-propyl-1-tetracosanyl hydrazinium chloride. |

As well as the individual amines of the type shown hereabove in Table 1 there are available, for the purposes of preparing compounds of the present invention, commercial mixtures of such tertiary amines. From these mixtures are prepared the "soya," "coco" and "hydrotallow" hydrazinium chlorides and similar products. These amine mixtures contain alkyl radicals of varying chain length which vary also in degrees of unsaturation. They will be fully described in terms of the specifications made available by their manufacturers in the examples which appear infra.

In discussing the several methods by which chloramine may be made available for reaction with the tertiary amine, we indicated that the choice of reaction medium could be varied extensively. We have successfully obtained our compounds by conducting the reaction of chloramine and the appropriate tertiary amine in anhydrous solution using as a solvent either an excess of the reactant amine or an unreactive organic liquid. The reaction may also be carried out in aqueous solution if such conditions appear to be preferable. The term unreactive, as applied to the organic liquid solvent, is intended to embrace those solvents that do not react preferentially with chloramine, ammonia or the reactant amine under the conditions employed. It is obvious, therefore, that the choice of solvent is one of economy and simplicity. For good absorption (and therefore reaction) it may be desirable to bubble chloramine through a long column of a solution comprising the tertiary amine dissolved in a relatively cheap inert solvent. Solvents which serve this purpose include hydrocarbons, e.g., heptane, cyclohexane, benzene, xylene and the like; ethers, e.g., diethyl ether, diamyl ether, dioxane and anisole; amides, e.g., dimethyl formamide and dimethylacetamide; halohydrocarbons, e.g., chloroform, carbon tetrachloride, trichlorethylene and trichlorbenzene; and nitroaromatics, e.g. nitrobenzene. For special purposes water and other hydroxcyclic solvents, such as ethanol and Cellosolve may be used.

The unobvious properties and utility of our novel compounds will be fully apparent from the commercial evaluation data which appears in the working examples. However, a few general comments are appropriate at this point. Our novel compounds show astonishing utility in the textile industry. No known hydrazinium salts are useful for such purposes.

As one facet of their utility in the textile field, our compounds have considerable surface activity which helps to make them excellent detergents and softening agents. Generally speaking, many fibers, including those textiles destined for use in garments or household applications (e.g., sheets, pillow cases, bed spreads, drapes, etc.) are finished with some type of softening agent. Softening is necessary to counteract the inherent harshness present in most textile fibers, and the added harshness caused by mechanical processing. Most types of softening agents possess a somewhat similar chemical structure. Ordinarily they comprise a molecule made up of a hydrophobic or lipophilic group, often derived from a long chain alkyl source, and a solubilizing or hydrophilic group. The hydrophilic group may be a quaternary structure (such as is characteristic of our novel compounds).

Softness (or hand, as it is known in the textile trade) can be effectively imparted to most fabrics by treating them with a water dispersion of any of our novel salts. A treating bath comprising 0.1 to 4% by weight of softener solids, based on the weight of cloth, and a total water volume equivalent to twenty times the weight of the fabric is sufficient for this purpose. The bath is preheated to a temperature of 115–120° F. The fabric is placed in the bath and agitated for a short period of time during which the softener exhausts from the bath onto the fabric. The fabric is subsequently dried and steam pressed.

As softeners our compounds are equal or superior to the competitive commercially available materials in the field. One of them, a mixture of hydrazinium salts containing chiefly methylbisoctadecylhydrazinium chloride, is more effective than any known standard softening agent for treating rayon or Orlon. Table 2 is illustrative of the astonishing effectiveness of this novel compound. In that table our novel softener is compared to standard commercial softening agents by showing Drape and Flex stiffness test data. Such Drape and Flex stiffness tests, performed according to Method 5206, Fed. Specification CCC-T-1901-B "Stiffness of Cloth, Drape and Flex Cantalever Bending Method (Pierce formula)," are indicative of the relative effectiveness of softeners.

TABLE 2

| Softener | Concentration; percent (based on fabric weight) | Drape Stiffness | Flex Stiffness, inch-pounds |
|---|---|---|---|
| Blank | 0.0 | 1.16 | $6.02 \times 10^{-4}$ |
| methyl-bis-hydrotallow hydrazinium chloride | 0.2 | 1.01 | $3.98 \times 10^{-4}$ |
| Commercial Softener "A" | 0.2 | 1.20 | $6.67 \times 10^{-4}$ |
| Commercial Softener "B" | 0.2 | 1.09 | $5.03 \times 10^{-4}$ |

In addition to their use as softeners, our novel compounds have good detergent properties which make them effective for general use in the textile industry. Not all surfactants are good detergents. In order for a surfactant to be an excellent detergent it must have (1) ability to wet and spread on liquid and solid surfaces, (2) ability to form a low and stable foam, (3) ability to emulsify oily materials, (4) ability to peptize aggregates of solid particles and (5) ability to deflocculate or stabilize dispersed systems of solid particles. This latter property is necessary to prevent soil redeposition on the surface of a clean fabric. Our novel compounds possess to a measurable extent these desirable properties. Furthermore, they may be converted to synergistically effective detergents by methods described in the co-pending application of Bernard Rudner, S.N. 619,691, filed Nov. 1, 1956.

In addition to their primary utility in the textile field our novel compounds have other diverse applications. For instance, they produce brightly colored dye-stuffs when treated with aqueous solutions of acid dyes (i.e., those substances containing sulfonic, carboxylic, or other acid groups). The resulting products, hydrazinium salts of the acid dyes, vary in physical properties with the chain length of the alkyl group and the particular dye used. Products ranging from solvent-soluble dyes to insoluble pigments have been prepared in this manner.

The addition of carbon tetrachloride to aqueous solutions of our novel compounds results in stable oil in water emulsions. Since our hydrazinium salts possess considerable anti-oxidant power, such emulsions are particularly useful as cutting oil additives for machine shop work.

The scope and utility of our invention is further illustrated by the following examples:

Example I

A chloramine generator was constructed according to the teachings of Sisler et al., supra. The generator consists of a horizontal Erlenmeyer flask, the bottom of which contains an outlet tube which is directed into the reactor containing liquid tertiary amine. Ammonia and chlorine (which may be diluted with nitrogen) are introduced separately into the top of the flask through concentric conduits. Chloramine and ammonium chloride are formed in the flask at the point where the chlorine and ammonia vapors come into contact. A rod is provided in the chlorine inlet stream to prevent any plugging of that stream with ammonium chloride. The outlet end of the flask is masked with glass wool to collect any ammonium chloride particles which otherwise would be directed into the bath of the amine. The chloramine yield for any one set of gas flow meter readings is determined by removing the reactor and generating the chloramine directly into a series of three chilled traps. Under the conditions of chloramine generation, only ammonia, chloramine, and nitrogen can pass through the glass wool into the traps. Since the traps are maintained at at least −70° C., the ammonia and chloramine condense therein and react relatively slowly (compared to the chlorine-ammonia reaction velocity) to form nitrogen and ammonium chloride. By allowing the low temperature condensate to come to room temperature slowly, the chloramine is converted quantitatively to non-volatile (at 20–30° C.) ammonium chloride, while the ammonia and nitrogen escape by volatilization. Therefore titration of the white residue (obtained on evaporation of the condensate) for chloride gives a direct measure of the chloramine generated. This can be related back to a measure of the chlorine used to obtain the chloramine yield. There is an alternate procedure which is suitable for use when chloramine is actually being consumed by reaction with a tertiary amine. The amount of chlorine used in a run, which is the limiting reagent quantity for yield calculation, can be measured directly, e.g., by weight of the chlorine cylinder before and after use, or by use of flow meters. The amount of ammonium chloride retained within the generator is determinable by titrating an aliquot of the aqueous solution of all of the solid remaining within the chloramine generator after the reaction has been completed. The chloramine yield, expressed as percent of the theoretical yield, can then be calculated from the formula:

$$\text{Percent} = \frac{(A-B)200}{A}$$

where A is the total number of moles of chlorine passed into the generator and B is the number of equivalents of chloride retained within the generator. The chloride content of the generator thus serves as an indicator of chloramine efficiency.

Example II

A mixture of tertiary amines of the formula $RN(CH_3)_2$ where R is a mixture of alkyl radicals derived from a commercial palmitic acid fraction is available commercially as "Armeen DM16." The distilled grade of this product, "Armeen DM16D," contains about 95% tertiary amine, the single long chain of which is approximately 92% hexadecyl, 7% octadecyl, and 1% octadecenyl. 15 g. of this product in 200 ml. of trichloroethylene were treated with approximately 5 g. of chloramine-ammonia gas stream for 53 minutes. There was no immediate heat of reaction, but a white solid formed slowly. Approximately 15 minutes after chloramine addition had been completed, the temperature of the reaction mixture rose spontaneously to almost 40° C. Filtration at room temperature gave 19.0 g. of a white solid, soluble in water, which was identified as the crude hydrazinium chloride. The major impurity in the product mixture was found to be ammonium chloride. The hydrazinium salts thus obtained are a mixture of hexadecyldimethyl, octadecyldimethyl, and octadecenyldimethyl hydrazinium chlorides in a weight ratio of approximately 92:7:1, representing a yield of 83% of theory. The pure product, recrystallized from ethyl acetate, runs clear at about 140° C. The product thus purified consists of fine dense crystals of the following elemental analysis: Percent C 66.91, percent H 12.48, percent N 8.68, percent Cl 11.23. Calculated for pure dimethylhexadecylhydrazinium chloride, $C_{18}H_{41}N_2Cl$: Percent C 67.35, percent H 12.87, percent N 8.73 and percent Cl 11.05.

On treating the pure salt with potassium hexafluorophosphate a water insoluble wax was formed which melted at 95° C. The preparative reaction for the novel hydrazinium chloride and the conversion of that compound to the hexafluorophosphate salt is shown below in Equation 1.

(1)
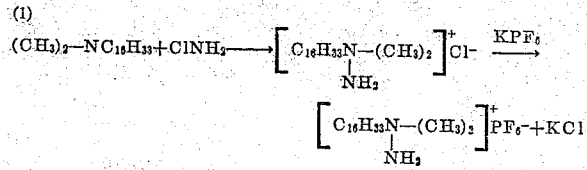

Example III

A 50 g. portion of the product of Example II was dissolved in 2000 ml. of boiling water. To this solution was added, with stirring, a 250 ml. solution containing 100 g. of potassium bromide. An immediate precipitate formed within the reaction mixture. The solution was allowed to stand overnight to give additional product. The white, soap-like precipitate was then filtered off, washed with water and vacuum dried to a constant weight at 40° C., and at 30″ gage to give 1,1-dimethylhexadecylhydrazinium bromide. This compound melted at about 155° C. Calculated for $C_{18}H_{41}N_2Br$: Percent C 59.16, percent H 11.31, percent N 7.67, and percent Br 21.87. Found: Percent C 58.42, percent H 10.94, percent N 6.98, percent Br 22.04.

Example IV

The procedure of Example III was substantially repeated using 100 g. of potassium iodide in lieu of the potassium bromide. Treatment of the aqueous solution of the hydrazinium chloride resulted in the formation of an oily precipitate which crystallized overnight to form a product similar to that of Example III, which melted at about 142° C. Calculated for 1,1-dimethylhexadecylhydrazinium iodide: Percent C 52.42, percent H 10.02, percent N 6.79; found: Percent C 52.42, percent H 9.92, percent N 6.29.

The products of Example III and Example IV show the same general solubility characteristics in organic solvents as does the product of Example II. However, there is a marked difference between the analogous chloride, bromide and iodide in aqueous solutions with respect to their solubilities. The dimethylhexadecylhydrazinium chloride is water soluble and forms micelles; the bromide is slightly water dispersible; and the iodide is water insoluble. The general preparative reaction for these analogous halides (products of Examples III and IV) is shown below in Equation 2.

(2)
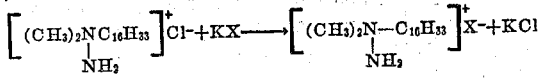

Example V

The base available commercially as "Armeen DM—18," is, according to its manufacturer, a mixture of compounds of the formula: $RN(CH_3)_2$, where R is approximately 7% hexadecyl, 90% octadecyl, and 3% octadecenyl. A 25 ml. portion of this amine (19.9 g.) dissolved in 250 ml. of xylene was reacted with chloramine from the generator described in Example I. The reaction mixture was allowed to stand for 2 hours and then filtered. The dried product was 24.2 g. of white solid, crude 1,1-dimethyl-1-octadecylhydrazinium chloride. This novel product was by analysis 85% pure and was obtained in 87% of the theoretical yield. On repeated recrystallization from isopropyl alcohol, it formed waxy plates that underwent a phase change at approximately 108° C., and melted with decomposition at about 160° C. Less pure samples, containing even small amounts of ammonium chloride, tend to melt at higher temperatures, often around 200–230° C. Our novel product is dispersible in cold water, forming soapy foaming colloidal dispersions. It is soluble cold in chloroform, dimethylformamide and Cellosolve. It is recrystallizable from ethyl and isopropyl alcohols, xylene, nitromethane and acetone. When treated with potassium hexafluorophosphate it formed a compound which decomposed about 176° C. The preparative reaction of the novel octadecyldimethylhydrazinium chloride and the further metathesis to produce the hexafluorophosphate salt is shown below in Equation 3.

(3)
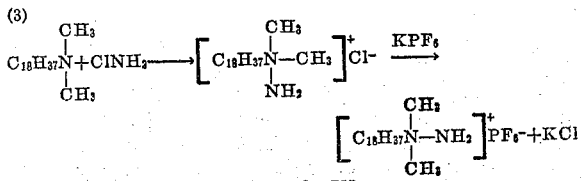

Example VI

The product available commercially as "Armeen DMCD" is a mixture of tertiary amines of the general formula: $R-N-(CH_3)_2$, where R is, according to the manufacturer, approximately 8% octyl, 9% decyl, 47% dodecyl, 18% tetradecyl, 8% hexadecyl, 5% octadecyl, and 5% octadecenyl. It is prepared for sale by converting mixed cocoanut oil fatty acids to the mixed amides, dehydrating these catalytically to the nitriles, and hydrogenating to give the mixed amine. The distilled, but unfractionated, primary amine mixture is then dimethylated, e.g., by the Eschweiler procedure (formic acid and formaldehyde). The tertiary amine is again distilled without fractionation to free it from the forerun of olefinic by-products and the non-volatile tailings.

A 400 g. portion of "Armeen DMCD" was dissolved in a mixture of 250 ml. of n-heptane and 250 ml. of dry chloroform. This solution was subjected to a chloramine gas stream from the generator of Example I. During the course of the reaction sufficient heptane was added to keep the volume constant. Although the reaction was exothermic, vaporization of the solvent served to keep temperature relatively constant. After the reaction was completed, a liter of chloroform was added and the mixture was filtered free of ammonium chloride. Partial stripping of the solvent gave two layers which, after being chilled, were separated by decantation. The upper, darker-colored layer contained about 70 g. of unconverted amine. The larger lower layer containing the crude hydrazinium chlorides was stripped of solvents, extracted cold with an equal volume of cyclohexane, then repeatedly washed with n-heptane. The washed oil, freed of solvent by heating first to 100° C. at one atmosphere, then at 60° C. at 30″ gage vacuum, was converted to a very soft tan paste. This material by analysis was approximately 98.5% hydrazinium chloride of the formula:

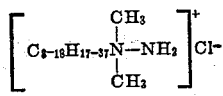

Approximately 225 g. of product were obtained by the procedure described above.

Example VII

The commercial mixture, "Armeen DMCD," described in Example VI was fractionally distilled through a laboratory column to get a major fraction boiling at approximately 145° C. at 35 mm. It was refractionated, and the middle third of the cut coming over at 144° C. and 35 mm. was taken as 95% pure dimethyldodecyl amine, $C_{12}H_{25}N(CH_3)_2$, molecular weight 214, on the basis of its neutralization equivalent with standard HCl solution.

A 160 g. portion of this purified amine was dissolved in approximately a liter of n-heptane. The solution was subjected to the chloramine ammonia gas stream at a rate of about 0.0025 mols of chloramine per minute for about four hours. Heptane was added as necessary to restore volume. The solution was filtered; the filtrate was reacted with additional chloramine and refiltered. Solids thus obtained were extracted with chloroform and the extracts were combined. Most of the solvent was removed and the resulting mixture was poured into approximately an equal volume (200 ml.) of ethyl acetate. A cloudy suspension of fine particles immediately resulted. The particles were removed by filtration, recrystallized several times from the ethyl acetate and vacuum dried to give 33 g. of off-white 1,1-dimethyl-1-dodecylhydrazinium chloride. This product was 95.8% pure by analysis. The low yield of pure product, in comparison to the hexadecyl and octadecyl compounds, is due to the poor chloramination reaction. This is readily understandable, since unconverted amine can be recovered in excellent yield from the heptane mother liquor and the ethyl acetate filtrate. This resistance to chloramination of the dodecylamine is apparently a steric effect, since it parallels the formation of macrocycles (i.e., Ruzicka and others have shown that 16- and 18-membered rings are formed in much higher yields and more readily than 10- to 12-membered rings).

Example VIII

The product of Example VII, dimethyldodecylhydrazinium chloride was converted to its iodide according to the procedure of Example IV. The iodide appears as opaque crystals softening at about 110° C. and running clear at about 125° C., while going dark yellow. Calculated for dodecyldimethylhydrazinium iodide: Percent C 47.18, percent H 9.34, percent N 7.86, percent I 35.62; found: Percent C 47.33, percent H 9.00, percent N 7.65, percent I 35.52.

Example IX

A 100 g. portion of tri-n-hexylamine in about 1000 ml. xylene was subjected to the chloramine stream from the generator (converting 0.06 mole chlorine/minute) for about 2¾ hours. The mixture was filtered and filtrate returned for additional chloramination. The cake obtained from the first and second treatment was about 90% ammonium chloride. The second filtrate was evaporated to give a viscous oil, almost pure 1,1,1-tri-n-hexylhydrazinium chloride. This oil resisted crystallization, even when purified by the ethyl acetate-petroleum ether procedure used by Westphal. Vacuum drying overnight gave greasy crystals of about 93% pure product, containing ammonium chloride as the principal impurity. Recrystallization from water gave pure the hydrazinium chloride [(C$_6$H$_{13}$)$_3$NNH$_2$]$^+$Cl$^-$.

*Example X*

An amine similar to that of Example II, available commercially as "Armeen DMS" has the same general formula (where R is a mixture of alkyl and alkenyl residues derived from soybean fatty acids and has approximately the composition 20% hexadecyl, 17% octadecyl, 26% octadecenyl, and 37% octadecadienyl). 20 g. of this amine were dissolved in 50 ml. of xylene. This solution was treated with the chloramine-ammonia gas mixture prepared by the generator described in Example I. This reaction mixture gave as a product a solvent-insoluble tan solid melting at 208–240° C. Extraction with chloroform followed by evaporation of this solvent and trituration with n-heptane gave purified 1,1-dimethyl-1-"soya"-hydrazinium chloride. This novel product appeared as a soft tan wax which ran clear at about 140° C. It is a highly unsaturated salt of the general composition:

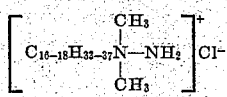

It is highly water soluble. It readily forms a hexafluorophosphate which decomposes at about 175° C.

The actual complexity of the novel product was demonstrated first by preparing it in trichloroethylene rather than xylene. Under such conditions the organic product which precipitates as chloramination proceeds is a mixture very largely of dimethylhexadecyl and dimethyloctadecylhydrazinium chlorides. Such a material resembles very closely the product obtained from chloramination of the dimethylhexadecyl-dimethyloctadecylamine mixture available commercially as "Armeen DMHT." However, from the trichloroethylene reaction filtrate was obtained a highly unsaturated, air-oxidizable pasty mixture of hydrazinium chlorides, largely the dimethyloctadecenyl and octadecadienylhydrazinium chlorides. Difference in composition of the two fractions is demonstrated by their reaction with iodine. Treatment of chloroform solutions of the two fractions slowly at room temperatures with half of the theoretical amount of iodine in chloroform gave a rapid decolorization and absorption by the unsaturated fraction resulting in the formation of a semi-solid mixture of iodooctadecyl and iodooctadecenyl hydrazinium chlorides. The saturated fraction, however, was oxidized by the iodine to a large extent, forming some amine hydroiodide, some nitrogen, and an unstable iodo-compound with strong oxidizing properties, presumably having a nitrogen to iodine covalent bond.

*Example XI*

In pre-pilot plant studies, it was suggested that a more efficient procedure for making the dimethylsoyahydrazinium chloride would be one in which less chloramine was lost as ammonium chloride. To obtain this desirable result it was considered of interest to run a limited amount of chloramine into a concentrated solution of amine, filter off the cake, then make the filtrate up to its original amounts of amine and solvent for rechloramination. The cycle was repeated until the by-product build up in the filtrate made its use less efficient.

Starting with 100 g. of dimethylsoyamine in xylene, chloramination was continued (using chloramine from a 0.0061 mole per minute flow of chlorine to the generator) until approximately 50% of the amine had reacted. The gelatinous product was filtered from the reaction mixture. Recycling the filtrate gave at the end of five runs a product equivalent to 74.5% of the theoretical yield (based on the chlorine to the generator) for a 58% conversion of amine. Where chloramine was used equivalent to a 71.5% conversion of amine in a similar run, the yield of isolated product dropped to 53.2% based on chloramine, the difference being due to the ammonium chloride formed. Use of a 33% amine solution gave higher conversions of chlorine to product than did the use of a 10% amine solution. The product as originally obtained is about 3% soluble in xylene at room temperature. Recycling, however, gives fractionation into more and less unsaturated fractions.

*Example XII*

An amine available commercially as "Armeen M2C" is approximately 84% R$_2$NCH$_3$ and 5% R$_3$N, where R is approximately 8% octyl, 9% decyl, 47% dodecyl, 18% tetradecyl, 8% hexadecyl, 5% octadecenyl, and 5% octadecyl. The amine is a viscous yellow liquid with a combined molecular weight of 389 for the mixture of tertiary amines, or 436 for the overall product. The mixture of 700 g. of "M2C" in 2 gallons of benzene was subjected for two and three quarter hours to a flow of 0.04 mole of chloramine per minute. As soon as the reaction was completed, the mixture was warmed slightly, filtered free of ammonium chloride, treated with an equal volume of heptane and evaporated. From the filtrate was obtained, after vacuum drying at 100° C., 650 g. of tan methyldicocohydrazinium chloride,

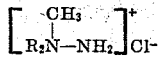

as a major component where R in the formula has the significance indicated above. Physically, the product appeared as a soft wax which, unpurified, contained practically no amine and very little ammonium chloride. On the basis of 89% tertiary amine the yield obtained was 92% of theory.

*Example XIII*

A base commercially available as "Armeen M2S," a mixture largely of tertiary amines having the formula R$_2$NCH$_3$ where R is soya (defined in Example X) was mixed in a 28 ml. quantity with 50 ml. of xylene. This mixture was treated over a period of ninety minutes with a three-fold excess of chloramine. A cold water bath was used to keep the temperature down to about 40° C. during the exothermic reaction which ensued. When all the chloramine was consumed the solution was filtered. The solid obtained therefrom was largely ammonium chloride containing about 14% product. The filtrate was evaporated to give a brown pasty residue, a crude 1,1-di"soya"-1-methylhydrazinium chloride. This material was extracted with ether to give pearly tan plates of pure product which were diethylether-insoluble. These plates were combined with the ether-washed chloroform-soluble portion of the reaction precipitate. The combined solids, recrystallized from ethyl acetate-either mixtures, gave pearly tan plates that on the melting point block ran clear at 158–160° C. The product was similar to that of Example X in that there was fractionation by solvents with less saturated, more soluble, and more nearly saturated, less soluble, portions.

*Example XIV*

An amine known commercially as "Armeen M2HT" is 86% R$_2$NCH$_3$ and 6% R$_3$N, where R is a hydrocarbon chain, derived from hydrogenated tallow fatty acids, containing approximately 30% hexadecyl and 70% octadecyl residues. The combined molecular weight of this product is calculated by its manufacturer to be about 522. This is based on an average amine purity of about 89 percent. The parent amine mixture, partially dissolved in approximately twice its weight of xylen, was treated with a chloramine-ammonia gas stream. During the chloramine addition, the base dissolved immediately, and after a few minutes a waxy emulsion appeared in the reaction mixture. The formation of this emulsion was accompanied by a temperature rise from 30 to 73° C. After cooling the mixture to room temperature, it was difficult to filter. A waxy solid was obtained by filtration after a xylene wash. The solid was a mixture of 12 parts $NH_4Cl$ and 88 parts of the hydrazinium salts, chiefly methyl-bis-octadecylhydrazinium chloride,

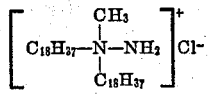

representing 63% of the theoretical yield of the desired product. This new compound was an amorphous white wax which could be recrystallized from water. It was moderately to very soluble in chloroform and recrystallizable from many other solvents. It yielded the characteristic derivatives with $KPF_6$ and $KHgI_3$. The pure product ran clear at about 160° C., first showing a phase change at about 90° C. The waxy crystals of 1,1-bis-hydrotallow-1-hydrazinium chloride, described as pure, actually represent a mixture of the homologous alkyls referred to above. Chromatographic separation on analytical grade silica gel gave some resolution into the 3 major components, but the method was tedious and unrewarding. Six recrystallizations from xylene, followed by recrystallization from water, gave a glistening white wax which analyzed very well for 1-methyl-1, 1-dioctadecylhydrazinium chloride. Calculated for $C_{37}H_{79}N_2Cl$, percent C 75.6, percent H 13.48, percent N 4.78, percent Cl 6.07; found percent C 75.5, percent H 13.61, percent N 4.78 and percent Cl 6.11.

*Example XV*

A solution of 15.5 g. of the technical grade dialkylmethylamine described in Example XIV as "Armeen M2HT" was dissolved in chloroform that had been previously dried over magnesium sulfate and placed in a large test tube equipped with two gas inlet tubes extending almost to its bottom, a gas outlet tube leading to Dry Ice-Dowenol traps and a thermocouple well. Solvent was added to give a head of about two inches above the bottom of the chlorine inlet tube, which in turn was slightly above the bottom of the ammonia inlet tube. Ammonia was passed through the solution for 2–3 minutes, while a very small stream of nitrogen was trickled through the chlorine feed line to sweep out ammonia. Chlorine equivalent to a total of 10.2 g. chloride was then bubbled in continuously over a period of 34 minutes. During this time the temperature of the reaction mixture rose from 31° C. to 40° C., and a white solid was formed as the reaction progressed. The gases were cut off, and in less than thirty minutes all traces of active chlorine in the reaction medium had disappeared (as tested with an acetic acid-potassium iodide solution). The mixture of a white crystal and light yellow supernatant was filtered rapidly; the solid was washed with two 50 ml. portions of dry chloroform. The washed and dried solid was shown by analysis to be ammonium chloride free of hydrazinium chloride. An aliquot of the chloroform filtrate, titrated for product, established the overrall yield of this reaction, based on amine, to be 83% of chemical theory. From the chloroform filtrate there was obtained on evaporation the crude 1-methyl-1,1-dioctadecylhydrazinium chloride (sometimes called 1,1-"dihydrotallow"-1-methylhydrazinium chloride). Recrystallization from xylene gave a nearly quantitative yield of crystalline product, melting at 145–147° C.

*Example XVI*

An ammonium chloride-free, amine-free portion of the unfractionated product of Example XIV was converted to the corresponding bromide by the procedure of Example III. Calculated for $C_{37}H_{79}N_2Br$: percent C 70.32, percent H 12.60, percent N 4.43, percent Br 12.65; found percent C 72.01, percent H 12.59, percent N 5.11, percent Br 12.24. The analytical results reflect the mixed nature of the hydrazinium cation.

*Example XVII*

In a similar manner the product of Example XIV was converted by the procedure of Example IV to the corresponding iodide. Calculated for $C_{37}H_{79}N_2I$: percent C 65.45, percent H 11.73, percent N 4.13, and percent I 18.69; found percent C 66.07, percent H 11.66, percent N 4.45 and percent I 17.6.

*Example XVIII*

An 11.37 g. portion of "Armeen 3HT," stated by its manufacturer to be 98.5% pure mixture of trihexadecyl and trioctadecylamine in about a 30 to 70 ratio was dissolved in 35 ml. xylene. This solution was reacted with chloramine from the generator; upon completion of the reaction a gelatinous product was obtained which was recrystallized twice from ethyl acetate, and then extracted with chloroform. The material thus obtained was vacuum dried to give off-white waxy 1,1,1-trishydrotallow-hydrazinium chloride melting at about 74 to 76° C. and having the following X-ray diffraction pattern:

| d | 12.8 | 8.50 | 6.37 | 5.86 | 5.43 | 5.06 | 4.19 | 4.02 | 3.72 | 3.34 | 3.18 |
|---|------|------|------|------|------|------|------|------|------|------|------|
| I/I₀ | 66(28) | 56(13) | 7(4) | 6 | 6 | 6 | 100 | 44 | 6 | 9 | 1 |

*Example XIX*

A highly branched chain amine mixture available commercially as "Primene JM–T" is reported to be a mixture of olefinic amines of the general formula

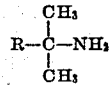

where R comprises unsaturated branched chain hydrocarbon residues of chiefly 15–21 carbon atoms. This commercial mixture is described as having an experimentally determined neutralization equivalent of 315, a boiling range of 265–308° C. (for 5–70%, at 760 mm.), a specific gravity at 25° C. of 0.840 and a refractive index at 25° C. of 1.456.

A stirred mixture of 0.2 mole (6.67 g.) paraformaldehyde and 0.3 mole (15.33 g.) of 90% formic acid were heated to 50–60° C. and at that temperature 0.1 mol (31.5 g.) of "Primene JM–T" was added over a period of 20 minutes. A slightly exothermic reaction ensued. The mixture was refluxed for one hour after the addition was completed and then cooled to 15–20° C. At that temperature, with good stirring, it was treated with an excess of 10% NaOH solution. 50 ml. xylene were added thereto. The upper organic layer was saturated and extracted twice with 50 ml. 1% NaOH solution, then twice with deionized water. This washed solution was dried over anhydrous magnesium sulfate for 2 hours. Since a small portion of the dried solution, on mixture with one-half its volume of freshly distilled, acid-free acetic anhydride, gave less than a 1° temp. rise, the product was taken as dimethyl-"Primene JM–T,"

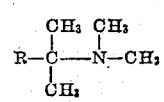

free of unreacted primary amine. The dried solution, in a long test tube, was diluted with two additional volumes of dry xylene. The test tube was then equipped with an ammonia inlet tube, a chlorine inlet tube, a thermometer and a gas outlet tube, as described in Example XV. The system was saturated with ammonia by bubbling through a stream of approximately 0.018 mole of ammonia per minute, while maintaining very slight head of nitrogen pressure on the chlorine inlet tube. After the ammonia bubbled through for 20 minutes, a chlorine stream of 0.001 mole per minute was started through the solution; both the chlorine and ammonia were allowed to flow for 2 hours. After the active chlorine had disappeared the mixture was filtered and washed well with cold xylene. It was then treated with 230 ml. portions of hot (about 100° C.) xylene and the combined filtrates and washings were evaporated dry. Test showed the white crystalline residues which were thus obtained to be almost pure ammonium chloride. The light-brown filtrate and wash on evaporation gave a very thick tan oil, very largely a solution of the chloramine adduct of dimethyl-"Primene" mixed with unreacted dimethyl "Primene." Titration of small portions of the residue with standardized silver nitrate solution and standardized HCl in isopropyl alcohol showed that the yield of hydrazinium chloride (chloramine adduct) based on the reacted amine was approximately 84%. Extraction of the residue with low boiling petroleum ether removed all of the unreacted tertiary amine and a small portion of the adduct, leaving a 1,1-dimethyl-1-alkylhydrazinium chloride,

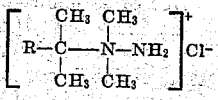

as a thick oil. It did not form a water-insoluble picrate or hexafluorophosphate. The preparative reactions for the intermediate dimethyl "Primene JM-T" and the novel chloramine adduct are shown below in Equations 4 and 5.

(4)

(5)
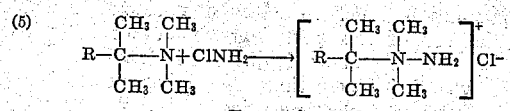

*Example XX*

A stirred dispersion of 5 g. of methylbis "hydrotallow" hydrazinium chloride (the product of Example XIV) and 100 ml. of water at 75° C. was treated dropwise over a period of 10 minutes with a solution of 5 g. NaSCN in 10 ml. water. An immediate flocculant white precipitate formed. The reaction mixture was cooled to room temperature with constant stirring, filtered, washed well with water and vacuum dried. A nearly quantitative yield of 1,1-bis-hydrotallow - 1 - methylhydrazinium thiocyanate was obtained by this procedure. The light white product is somewhat greasy to the touch but less so than the chloride. It is less soluble than the corresponding chloride in water, although it appears to be more soluble in xylene and isopropyl alcohol. It melts clear at about 60° C. and decomposes with gas evolution and darkening at about 180° C. The preparative reaction is shown below in Equation 6.

(6)
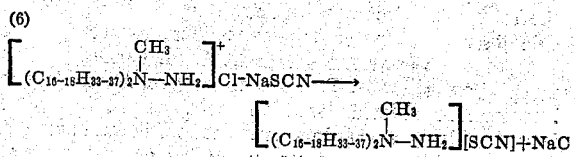

*Example XXI*

Attempts to prepare the hydrazinium thiocyanate of Example XX from the products of Example XVI or XVII (the bromides and iodides analogous to the product of Example XIV) failed to produce a good yield of pure product. With the hydrazinium bromide, the thiocyanate, relatively free of bromide, can be made to precipitate in a relatively pure state only if it is run in much more dilute solutions: viz: 0.1 to 1% by weight. It is also necessary that these solutions are kept above about 60° C. since below that temperature the thiocyanate precipitate is badly contaminated by unreacted bromide. The iodide (the product of Example XVII) is not appreciably more soluble than the thiocyanate, if that soluble. Therefore, attempts to convert the iodide to the pure thiocyanate by the metathesis of Example XX have failed completely.

*Example XXII*

The success of the simple metathesis reactions described in Examples XX and XXI depend on solubility relationships. This is likewise true for many uses of hydrazinium salts. For this reason a comparative solubility study was made of two sets of halides. One percent by weight solutions of the products of Examples II, III and IV, XIV, XVI, and XVII, in water were prepared at temperatures not over 70° C. and allowed to cool to room temperature. The observations on the relative solubility of these compounds are reported below in Table 3.

TABLE 3

| Compound | Observations |
| --- | --- |
| (A) 1,1-dimethyl-1-hexadecylhydrazinium chloride. | Clearly soluble and transparent at room temperature and above. |
| (B) 1,1-dimethyl-1-hexadecyl hydrazinium bromide. | Clearly soluble at 70° C., not at room temperature. |
| (C) 1,1-dimethyl-1-hexadecyl-hydrazinium iodide. | Clearly soluble at 70° C., not at 60° C. |
| (D) 1,1-bis"hydrotallow"-1-methylhydrazinium chloride. | Fluid, opalescent, complete dispersion at room temperature. |
| (E) 1,1-bis"hydrotallow"-1-methylhydrazinium bromide. | Few crystals undissolved and undispersed even at 70° C. |
| (F) 1,1-bis"hydrotallow"-1-methylhydrazinium iodide. | Many crystals undissolved a 70° C. less soluble than C or E. |

*Example XXIII*

The procedure of Example XXII was substantially repeated using 0.25% deionized water solutions of the six compounds listed in Table 3, at approximately 70° C. On being allowed to cool to room temperature compounds B, C, E, and F (as designated above in Table 3) crystallized out as platelets. Compound A remained clearly dissolved and compound D clearly dispersed. The practical disadvantages of the poor solubilities exhibited by compounds E and F are cogently demonstrated by the results of Example XXVI.

*Example XXIV*

Equal volumes of the 0.1% solutions of compounds A, C, D, and F of Example XXII (using the designation of Table 3), were treated with 3 drops of a 10% starch dispersion and then with 1 ml. of hydrogen peroxide solution. The results are reported in Table 4 below.

TABLE 4

| Compound | Observations |
| --- | --- |
| (A) 1,1-dimethyl-1-hexadecylhydrazinium chloride. | No discloration. |
| (C) 1,1-dimethyl-1-hexadecylhydrazinium iodide. | Very dark stain. |
| (D) 1,1-bis"hydrotallow"-1-methylhydrazinium chloride. | No discoloration |
| (F) 1-1-bis"hydrotallow"-1-methylhydrazinium iodide. | Dark stain. |

Formation of the discoloration characteristic of the iodine-starch complex is proof of the lack of commercial usefulness of the hydrazinium iodides in the textile industry. Thus, consider a starched fiber treated with (*a*) first a hydrazinium chloride and (*b*) a hydrazinium iodide. Subsequent laundering of the fibers in the presence of any common laundering oxidant, e.g. hypochlorite, peroxide, perborate or chloroamide can cause oxidation of the iodide, but not the chloride, to the stain-producing starch-iodine complex. This cogent proof of the ineffectiveness of hydrazinium iodides as textile adjuvants is further supplemented by the results of Examples XXV and XXVI.

*Example XXV*

As a quick practical substantiation of conclusions reached in Example XXIV pairs of white cotton fabric swatches were impregnated by padding to a 2% concentration of the following hydrazinium salts: blank (none) and compounds A, C, D, E, and F as named in Table 3, supra. These fabric swatches were air dried and separated into two sets. One set of the fabrics were retained and the other set was exposed to the action of nitrous oxide gas flowing from a cylinder at a controlled rate through a chamber in which the fabrics were suspended. After exposure all of the fabrics were ironed with a steam iron for purposes of applying wet heat. Tensile test measurements were made on the fabric swatches. The results are shown in Table 5.

TABLE 5

| Compound | Breaking Strength (Grab Method) in lbs. | |
|---|---|---|
|  | Before nitrous oxide Exposure | After Exposure |
| None (blank) | 78 | 69.0 |
| A. Dimethylhexadecylhydrazinium chloride | 70 | 70.0 |
| C. Dimethylhexadecyl-hydrazinium iodide | ¹ 80 | ¹ 77.0 |
| D. Methylbishydrotallow-hydrazinium chloride | 75.5 | 80.0 |
| E. Methylbishydrotallow-hydrazinium bromide | 77.5 | 76.0 |
| F. Methylbishydrotallow-hydrazinium iodide | ¹ 71.2 | ¹ 63.0 |

¹ Yellowed excessively.

The results in Table 5 make it increasingly obvious that while hydrazinium bromides and iodides may give some degree of protection against oxidative degradation of the cotton, only the chlorides give truly adequate protection without discoloration. In fact, the methylbishydrotallow-hydrazinium chloride, the most effective textile softener among our novel compounds, actually increased the strength of the tested fiber by 6%. The excessive yellowing of the fabrics treated with the hydrazinium iodide on steam ironing again substantiated the proposition that hydrazinium iodides were totally unsuitable for textile work.

*Example XXVI*

Swatches of red acetate taffeta and green acetate satin were impregnated by padding to a 1% concentration with 1,1-bishydrotallow-1-methylhydrazinium chloride, 1,1-bishydrotallow-1-methylhydrazinium bromide, and 1,1-bishydrotallow-1-methylhydrazinium iodide. The swatches were then air dried. Visual examination convincingly showed that only the chloride was uniformly distributed throughout the fabric. On steam ironing to remove wrinkles in the cloth it was found that the hydrazinium bromide caused appreciable spotting of the fabric. Likewise, the iodide caused marked spotting. Only the chloride gave the same spot free fabric comparable to the blank. On the basis of this test alone it can be concluded that only the chloride is suitable for finishing dyed fabric, since spotting makes the fabric totally unacceptable to the public. The potential hazard resulting from spotting when the hydrazinium bromides or hydrazinium iodides are used will rule them out as acceptable textile finishing agents.

*Example XXVII*

To prove the superiority of our novel products as effective textile softeners cotton fabric was impregnated by the exhaustion procedure with 0.1%, 0.4% and 0.5% concentrations (based on the weight of the fabric) of the products of Examples VIII, IX and XIV. The conditioned fabrics were tested for flex stiffness by the procedure described in the specification, supra. The results of these additional standard softening tests are shown below in Table 6.

TABLE 6

| Concentration | Blank | Hydrazinium Salts | | |
|---|---|---|---|---|
|  |  | Bishydrotallow | Trihexyl | Dodecyl |
| 0 | $2.07 \times 10^{-4}$ |  |  |  |
| 0.1% |  | $1.45 \times 10^{-4}$ | $1.78 \times 10^{-4}$ | $1.56 \times 10^{-4}$ |
| 0.4% |  | $0.967 \times 10^{-4}$ | $1.41 \times 10^{-4}$ | $1.27 \times 10^{-4}$ |
| 0.5% |  | $1.17 \times 10^{-4}$ | $1.56 \times 10^{-4}$ | $1.41 \times 10^{-4}$ |

Table 6 indicates that each of hydrazinium chlorides tested showed a degree of softening effect. However, it is undeniable that the methylbishydrotallowhydrazinium chloride is markedly superior to either of the other chlorides tested. In fact, at 0.4% concentration is showed more than 100% improvement in softness over the blank sample. However, the choice of a commercial textile softener is predicated on considerations of a far wider and deeper kind than the objective tests shown hereabove. Aesthetic considerations of "hand," "fullness" and "softness" have long been employed by the users of textile softeners to judge the practical effectiveness of these compounds. It may be added at this point that the trihexylhydrazinium chloride tends to impart odor to the treating solution. Such an aesthetic consideration would make the use of this particular compound untenable. However, of even greater significance in textile work are detergency and deflocculation. Objective measurements of these important characteristics, which are so essential to textile adjuvants, clearly demonstrate the superiority of our novel compounds.

*Example XXVIII*

The co-pending application of Bernard Rudner S.N. 619,691, filed November 1, 1956, discusses the use of our novel surfactant hydrazinium chlorides as valuable parts of detergent mixes. We have shown that some of our novel compounds are unexpectedly valuable detergents in themselves. To prove this unexpected utility, the following experiment was run. Test swatches 4 x 8″ were prepared by stapling 4 x 4″ swatches of Foster D. Snell soiled cotton to 4 x 4″ swatches of clean Indian Head cloth. The Indian Head cloth had previously been scoured and desized by washing with "Renex-20" (a commercially available nonionic detergent). Test swatches, in individual Mason jars, were treated with twenty times their weight of 0.25% aqueous solutions of the four hydrazinium chlorides listed below in Table 7. The tests were run in triplicate. The twelve swatches were then run in an Atlas-Launder-Ometer using a 1 hour wash cycle at 140° F. Swatches were rinsed free of hydrazinium chloride solution, dried at 120° F., and ironed. Using a Gardner Automatic Photometric Unit equipped with a green filter, reflectometer readings were taken of each trio of swatches and averaged. The results are shown in Table 7.

TABLE 7
DETERGENCY

| Hydrazinium Chloride | Gardner Reflectometer Reading | |
|---|---|---|
| | Soiled Cloth | Variation from Control |
| None (control) | 24.8 | |
| Trihexyl | 24.7 | −0.1 |
| Dimethyldodecyl | 24.8 | 0.0 |
| Dimethylhexadecyl | 35.2 | 10.4 |
| Dimethyloctadecyl | 38.7 | 13.9 |

Detergency is a primary attribute of compounds which are useful in the textile industry. The objective data of Table 7 is a synergistic measurement of (1) preferential wetting, (2) dispersion, (3) deflocculation and (4) emulsification. It has been previously indicated that a surface-active compound must posess each of these properties in order to be an effective detergent. The usefulness of a surface active compound as a detergent is limited by the poorest of these four properties. The first of these, preferential wetting, is equally important in the selection of a softener. Like detergency, effective softening demands uniformity. Uniformity of softening is only obtained through a high degree of wetting and spreading on the fabric. Drape and Flex tests are not necessarily conclusive as to the uniformity of softening of the fabric. It is true that Table 7 cannot be used to demonstrate preferential wetting alone. The combined effects of dispersion, deflocculation and emulsification may well mask this particular property. Non obstant this possibility Table 7 cogently shows a marked difference in kind and not merely in degree between the compounds of short carbon chain such as the dimethyldodecylhydrazinium chloride and those having longer carbon chains such as the dimethylhexadecylhydrazinium chloride. Only these latter compounds have commercial potential as textile adjuvants.

Example XXIX

Using the standard dilution technique, aqueous solutions of the hydrazinium salts of Examples II, III, IV, VII and VIII were inoculated with a 4 mm. loop of actively growing 24 hour old Difco infusion broth cultures of micrococcus pyrogenes var. aureus. These cultures were incubated at 37° C. for 48 hours and then examined microscopically for colonies. Once bracketing dilutions were found, additional dilutions were made to obtain the minimum inhibitory concentration. As a control, the commercially important quaternary ammonium antiseptic agent "Zephiran" was used. Results appear in Table 8 below:

TABLE 8
*Bacteriostatic effects*

| Compound | Minimum Inhibitory Concentration |
|---|---|
| Dimethylhexadecylhydrazinium chloride | 1:46,000 |
| Zephiran | 1:36,000 |
| Dimethylhexadecylhydrazinium iodide | 1:35,000 |
| Dimethylhexadecylhydrazinium bromide | 1:32,000 |
| Dimethyldodecylhydrazinium chloride | 1:30,000 |
| Dimethyldodecylhydrazinium iodide | 1:1,000 |

Thus is can be seen that our novel dimethylhexadecylhydrazinium chloride is not only more effective than the known hydrazinium chlorides, bromides or iodides, but it is even 12% stronger than one of the standard commercial bacteriostats.

Example XXX

Hydrazinium halides of Examples II, III and IV were tested for their anti-static effect on hydrophobic fibers. Samples of a Dacron fiber were impregnated by the padding technique with 0.4% by weight based on the weight of the fiber of the three hydrazinium salts. Measurements of static propensity were made at 30% RH, 40% RH, and 50% RH.

TABLE 9
ANTI-STATIC PROPERTIES

["Dacron" fiber impregnated with 0.4% by weight of hydrazinium salt.]

| Hydrazinium Salt | Percent Relative Humidity | | |
|---|---|---|---|
| | 30 | 40 | 50 |
| Hexadecyldimethyl chloride | 0 | 0 | 0 |
| Hexadecyldimethyl bromide | 56 | 32 | 0 |
| Hexadecyldimethyl iodide | 40 | 20 | 0 |

Table 9 shows that the hexadecyldimethylhydrazinium chloride is astonishingly useful as an anti-static agent, since at the humidities tested it showed no static propensity. This difference between the chloride and the corresponding bromide and iodide with relation to anti-static properties, is completely unexpected.

Example XXXI

The anti-static tests described in Example XXX were continued varying the amount of hydrazinium salt used. Measurements of the static propensity were made at 28% RH. Results are shown below in Table 10.

TABLE 10
ANTI-STATIC PROPERTIES

["Dacron" treated at 28% relative humidity]

| Hydrazinium Salt | Weight Percent on Fibre | | | | |
|---|---|---|---|---|---|
| | 0.05 | 0.1 | 0.2 | 0.3 | 0.4 |
| Hexadecyldimethyl chloride | 9 | 2 | 0 | 0 | 0 |
| Hexadecyldimethyl bromide | 84 | 78 | 100 | 38 | 14 |
| Hexadecyldimethyl iodide | 46 | 24 | 12 | 30 | 20 |

Table 10 further demonstrates the unobvious utility of the hexadecyldimethylhydrazinium chloride as an anti-static agent. Even at concentrations of active agent deposited on the fiber as low as 0.05% this chloride showed only negligible static propensity. The bromide and iodide were ineffective as anti-static agents.

Example XXXII

The hydrazinium halides of Examples II, III and IV, were tested for their ability to function as dispersing or deflocculating agents. A device was constructed consisting of an optically clear sample holder enclosed in a light-tight housing, a source of constant intensity, a photonic cell, and microammeter. Light transmission through solutions containing the compound to be tested in known concentrations and dispersed or suspended carbon black is measured at regular time intervals and the amount of light transmitted through the dispersion is indicated by the intensity of the current generated by the photonic cell. The current intensity is observed in microamperes and recorded. The instrument is standardized so that water contained in the same sample holder had a transmission of 100 microamperes. 100 cc. of solution containing 0.1% carbon black and 1% of the compound selected for testing were prepared and transmission was measured immediately after preparation. The remaining solution was allowed to stand in a 100 cc. graduate and after 10 minutes a sample was pipetted from the middle of the remaining solution. Transmission measurements were again made. At 10 minute intervals samples were taken until four readings were obtained. The results of these tests appear in Table 11.

TABLE 11

DISPERSION AND DEFLOCCULATION PROPERTIES

| Hydrazinium Salt | Reading in Microamperes | | | | |
|---|---|---|---|---|---|
| | Initial | After 10 min. | After 20 min. | After 30 min. | After 40 min. |
| Hexadecyldimethyl chloride | 34 | 42 | 44 | 47.5 | 46.5 |
| Hexadecyldimethyl bromide | 42.5 | 57 | 60 | 72 | 75 |
| Hexadecyldimethyl iodide | 45 | 64 | 74 | 78 | 82 |
| Carbon black only | 45 | 54 | 70 | 72 | 79.5 |

Once again the hexadecyldimethylhydrazinium chloride demonstrated its superiority for textile purposes. It was considerably better than the bromide in its dispersion and deflucculation properties. The iodide was least effective of the compounds tested; in fact, it exhibited flocculating effects on the carbon black.

In summary, it may be said that our novel acyclic hydrazinium chlorides possess unobvious properties and utility in their application to the textile industry. Examples XXII, XXIII, XXIV, XXV, and XXVI present substantial evidence that only the chlorides and not the corresponding analogous halides are suitable as textile adjuvants. First, of the halides only the chloride possesses the desirable solubility characteristics of complete solution and dispersion. Second, the chlorides show pronounced advantage over the iodides in that they form no colored complex when oxidized in the presence of starch. That the dark stains resulting from the formation of an iodine complex on the surfaces of a starched fiber are undesirable is too obvious to be labored at great length. Third, the hydrazinium chlorides do not appear to impair the tensile strength of cotton fabrics treated with these salts and exposed to acid oxidation influences. This same desirable property does not obtain for the corresponding bromides and iodides. The iodides show considerable yellowing after steam ironing. Fourth, the chlorides seem to be especially effective for treating dyed fabrics. They have better wetting and spreading ability, and moreover because of their solubility after steam ironing they show no spotting or specking of the fabric surface. The corresponding bromides and iodides are unfortunately subject to this undesirable result. The data given in the specification, strongly supplemented by the results of Example XXVII, show that the methylbishydrotallowhydrazinium chloride is one of the most remarkable softening agents known. The objective Drape and Flex tests show the marked superiority of this compound, although they give no indication of the even more important aesthetic considerations upon which the commercial success of this specific chloride will be predicated. The higher molecular weight chlorides possess superior wetting and spreading ability which aids considerably in imparting to a fabric a uniform softness after treatment. This uniform spreading and wetting does not readily obtain with the lower molecular weight chlorides. Moreover, none of these latter compounds impart the plump and fluffy hand to the textiles after treatment. Example XXVIII clearly demonstrates that only the longer chain hydrazinium chlorides (viz: those having at least one aliphatic hydrocarbon chain of 16 or more carbon atoms) are effective detergents. Detergency is an important consideration in the selection of a textile adjuvant. In this respect the shorter chain chlorides are unsuitable for textile applications. The anti-static tests on the hydrophobic fiber "Dacron," show in a completely unpredictable manner that the dimethylhexadecylhydrazinium chloride is astonishingly effective as an anti-static agent. Examples XXX and XXXI clearly demonstrate this unobvious and most useful property. This same compound in Example XXIX is shown to be unexpectedly effective in its bacteriostatic effect on micrococcus pyrogenes var. aureus. When compared to a known commercial standard it alone, of the compounds tested, showed superior bacteriastatic property. Such a property is of more than nominal value in an agent used for textile cleansing purposes as well as for other diverse applications.

The foregoing test data clearly shows that of aliphatic hydrazinium halides only the chlorides embraced by the present invention have utility as textile adjuvants. The softening properties imparted to a fabric by the methylbishydrotallowhydrazinium chloride make this compound superior to the members of its class for this particular use. The dimethylhexadecylhydrazinium chloride showed unobvious anti-static and bacteriostatic properties.

We claim:
1. Compounds having the general formula

$$(RR'R''N-NH_2)Cl$$

wherein R is an alkyl radical having from 16 to 24 carbon atoms and R' and R'' are alkyl radicals having from 1 to 24 carbon atoms.

2. Compounds having the general formula $$(RR'R''N-NH_2)Cl$$

wherein R is an alkenyl radical having from 16 to 14 carbon atoms and R' and R'' are alkyl radicals having from 1 to 24 carbon atoms.

3. Compounds having the general formula $$(RR'R''N-NH_2)Cl$$

wherein R is an alkadienyl radical having from 16 to 24 carbon atoms and R' and R'' are alkyl radicals having from 1 to 24 carbon atoms.

4. The composition consisting essentially of 70% 1-methyl-1,1-dioctadecylhydrazinium chloride and 30% 1-methyl-1,1-dihexadecylhydrazinium chloride.

5. The composition consisting essentially of 37% 1,1-dimethyl-1-octadecadienylhydrazinium chloride, 26% 1,1-dimethyl-1-octadecenylhydrazinium chloride, 20% 1,1-dimethyl-1-hexadecylhydrazinium chloride and 17% 1,1-dimethyl-1-octadecylhydrazinium chloride.

6. 1,1-dimethyl-1-hexadecylhydrazinium chloride.
7. 1,1-dimethyl-1-octadecylhydrazinium chloride.

References Cited in the file of this patent

Westphal: Ber. Deut. Chem., vol. 74, pp. 759–776, 1365–72 (1941).

Omietanski et al.: JACS., vol. 78, pp. 1211–13 (Mar. 20, 1956).

UNITED STATES PATENT OFFICE

CERTIFICATE OF CORRECTION

Patent No. 2,929,847                                           March 22, 1960

Bernard Rudner et al.

It is hereby certified that error appears in the printed specification of the above numbered patent requiring correction and that the said Letters Patent should read as corrected below.

Column 6, line 13, after "5 g. of" insert -- chloramine in a --; column 10, line 60, for "acetate-either" read -- acetate-ether --; column 11, line 2, for "xylen" read -- xylene --; column 13, lines 70 and 71, right-hand portion of Equation (6) should appear as shown below instead of as in the patent:

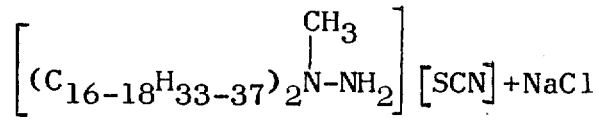

column 14, TABLE 3, second column thereof, third line from bottom, for "a" read -- at --; same column 14, TABLE 4, second column thereof, first line, for "discloration" read -- discoloration --.

Signed and sealed this 22nd day of November 1960.

(SEAL)
Attest:

KARL H. AXLINE                                  ROBERT C. WATSON
Attesting Officer                               Commissioner of Patents